United States Patent [19]
Kim

[11] Patent Number: 5,948,048
[45] Date of Patent: Sep. 7, 1999

[54] SYSTEMS, METHODS AND PROGRAM PRODUCTS FOR REPRESENTING A BINARY WORD AS TWO BINARY WORDS HAVING FEWER BINARY ONES

[75] Inventor: Tae-Sung Kim, Seoul, Rep. of Korea

[73] Assignee: Samsung Electronics Co., Ltd., Rep. of Korea

[21] Appl. No.: 08/718,860

[22] Filed: Sep. 24, 1996

[30] Foreign Application Priority Data

Sep. 25, 1995 [KR] Rep. of Korea ................. 95-31639

[51] Int. Cl.[6] ................. G06F 7/00; G06F 15/00
[52] U.S. Cl. ................. 708/200; 708/204; 708/210; 708/212
[58] Field of Search ................. 364/715.09, 715.11, 364/715.1, 715.03, 715.011

[56] References Cited

U.S. PATENT DOCUMENTS

| | | | |
|---|---|---|---|
| 4,215,419 | 7/1980 | Majerski | 364/760.01 |
| 5,276,633 | 1/1994 | Fox et al. | 364/721 |
| 5,574,670 | 11/1996 | Lozano | 364/715.1 |

*Primary Examiner*—Emmanuel L. Moise
*Attorney, Agent, or Firm*—Myers Bigel Sibley & Sajovec

[57] ABSTRACT

First and second binary words representing a third binary word having a predetermined number of bits are determined in a data processing system by storing a first word the same as the third binary word and storing a second word having the predetermined number of zero bits in the data processing system. A pair of consecutive order bits having a binary "1" value is searched for in the third binary word, starting at the least significant bit of the third binary word. Each of the first and second words is incremented by 2 raised to a lowest order of the pair of consecutive order bits, for a pair of consecutive order bits having a binary "1" value found in the binary word. Preferably, the steps of searching and incrementing are repeatedly performed for pairs of consecutive order bits in the third binary word having binary "1" value distinct from previously found pairs of lesser order consecutive order bits in the third binary word.

10 Claims, 1 Drawing Sheet ing which preferred embodiments of the invention are shown.

SYSTEMS, METHODS AND PROGRAM PRODUCTS FOR REPRESENTING A BINARY WORD AS TWO BINARY WORDS HAVING FEWER BINARY ONES

FIELD OF THE INVENTION

The present invention relates to data processing systems, methods and computer program products, more particularly, to data processing systems, methods and computer program products for manipulating binary words.

BACKGROUND OF THE INVENTION

General positive numbers can be represented in a data processing system many ways, but conventional data processing hardware generally represents numbers as binary words, i.e., words having bits which are either a "1" or a "0." The manner in which numbers are represented in hardware can affect calculation speeds, for example, when using the representations in logic operators such as adders, multipliers, comparators and the like. For example, a bit value "1" has a different effect in a multiplication operation than a bit value "0." In multiplying the two eight-bit binary numbers 01001010 and 00000101, the multiplication operation follows along these lines:

```
    01000101
  × 00000101
    ────────
    01001010
   01001010
   ─────────
   0101110010
``` wherein an addition operation is performed for each bit in the multiplier 00000101 which has a binary "1" value. Generally, the more bits there are in the multiplier having a binary "1" value, the greater number of additions that are performed. Accordingly, the efficiency of a multiplication may depend on the number of bits in the multiplier having a binary "1" value.

SUMMARY OF THE INVENTION

In light of the foregoing, it is an object of the present invention to provide systems, methods and computer program products which represent a binary number in a form which is efficient for computational operations.

This and other objects, features and advantages are provided according to the present invention in systems, methods and computer program products in which first and second binary words are determined, the first and second binary words representing a third binary word having a predetermined number of bits, the predetermined number of bits ranging from a least significant bit to a most significant bit, the first and second binary words each including a fewer number of bits having a binary "1" value than the third binary word. Thus, the first and second words may be used in computational operations in lieu of the third binary word, to allow more efficient execution of the computational operations.

In particular, according the present invention, first and second binary words representing a third binary word having a predetermined number of bits are determined in a data processing system by storing a first word the same as the third binary word and storing a second word having the predetermined number of zero bits, in a data processing system. A pair of consecutive order bits having a binary "1" value is searched for in the third binary word, starting at the least significant bit of the third binary word. Each of the first and second words is incremented by 2 raised to a lowest order of the pair of consecutive order bits, for a pair of consecutive order bits having a binary "1" value found in the binary word. Preferably, each of the first and second words are incremented by 2 raised to a lowest order of the pair of consecutive order bits, for a second pair of consecutive order bits in the third binary word having binary "1" value. An iterative technique for determining first and second binary words having a fewer number of bits having a binary "1" value than the third binary word is thereby provided.

A data processing system for determining first and second binary words representing a third binary word includes first storing means for storing a first binary word having the predetermined number of bits and second storing means for storing a second binary word having the predetermined number of bits. The system also includes means for setting the stored first binary word to the third binary word and for setting the stored second binary word to zero. Means for searching search for a pair of consecutive order bits having a binary "1" value in the third binary word, starting at the least significant bit of the third binary word. Means for incrementing each of the first and second binary words, responsive to the first and second storing means and to the means for searching, increment each of the first and second binary words by 2 raised to a lowest order of the pair of consecutive order bits, for a pair of consecutive order bits having a binary "1" value found in the third binary word.

A computer program product according to the present invention includes a computer-readable storage medium having computer-readable program code means, embodied in the medium, for determining first and second binary words representing a third binary word having a predetermined number of bits, the predetermined number of bits ranging from a least significant bit to a most significant bit, the first and second binary words including a fewer number of bits having a binary "1" value than the third binary word. The computer-readable program code means includes first computer-readable program code means for storing a first word the same as the third binary word and second computer-readable program code means for storing a second word having the predetermined number of zero bits. Third computer-readable program code means for searching search for a pair of consecutive order bits having a binary "1" value, in the third binary word, starting at the least significant bit of the third binary word. Fourth computer-readable program code means for incrementing each of the first and second binary words, responsive to the first, second and third computer readable program code means, increments each of the first and second words by 2 raised to a lowest order of the pair of consecutive order bits, for a pair of consecutive order bits having a binary "1" value found in the binary word. Systems, methods and program products for representing a binary word using a reduced number of bits having binary "1" value are thereby provided.

BRIEF DESCRIPTION OF THE DRAWINGS

Some of the objects and advantages of the present invention having been stated, others will be more fully understood from the detailed description that follows and by reference to the accompanying drawing in which.

DETAILED DESCRIPTION OF PREFERRED EMBODIMENTS

Figure 1:
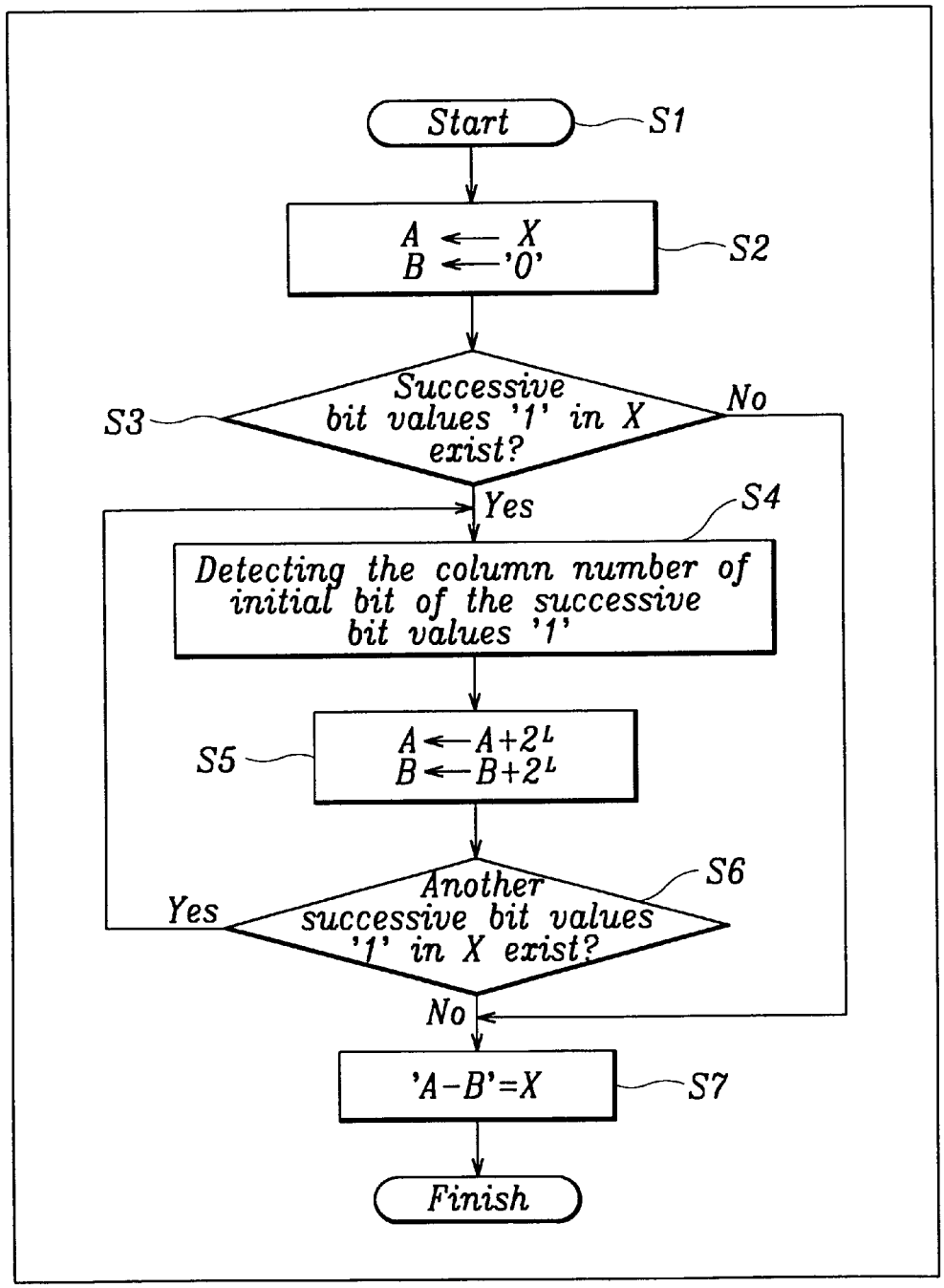
FIG. 1 is a flow chart illustration of operations for determining first and second binary words for representing a third binary word according to the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

For an M-bit word X, the maximum bits having binary "1" value is M. If X is presumed to represent a positive number, and is represented in 2's compliment format, the most significant bit generally has binary "0" value.

Binary words A, B and X which represent positive numbers may be defined as sums of powers of 2:

$$A = a_{M-1}2^{M-1} + a_{M-2}2^{M-2} + \ldots + a_0 \ldots$$

$$B = b_{M-1}2^{M-1} + b_{M-2}2^{M-2} + \ldots + b_0 \ldots$$

$$X = x_{M-1}2^{M-1} + x_{M-2}2^{M-2} + \ldots + x_0 \ldots$$

For representation of positive number in 2's compliment format, the most significant bit of each word are zero, i.e., $x_{M-1} = a_{M-1} = b_{M-1} = 0$.

Binary word X may be represented as:

$$X = a - b \quad (A > 0, B > 0, X > 0, A > X, A > B)$$

Accordingly, it is possible to represent X as a difference of two binary words A and B, such that the binary words A and B have the same number of bits or a lower number of bits having binary "1" value than the binary word X, allowing the two binary words A and B to be used in place of the binary word X in order to streamline computations.

It will be understood by those having skill in the art that one or more (including all) of the elements/steps of the present invention may be implemented using software executing on a data processing system, using special-purpose hardware, or using combinations of special purpose hardware and software. FIG. 1 is a flowchart illustration of methods, systems and computer program products according to the invention. It will be understood that each block of the flowchart illustration, and combinations of blocks in the flowchart illustration, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

FIG. 1 illustrates operations for determining first and second M-bit binary words to represent a third M-bit binary word, such that the first and second binary words have a reduced number bits having binary value "1" in comparison to the third binary word (Block S1). First, a binary word the same as the third binary word X is stored for the first binary word A, and a binary word having bits which are all zeros is stored for the second binary word B (Block S2). Starting at a least significant bit, the third binary word X is searched for a pair of consecutive order bits having binary "1" value (Block S3). If a pair of consecutive order bits having binary "1" value is found, the first binary word A and the second binary word B are incremented by 2 raised to the power of the lowest order of the pair of consecutive order bits (Blocks S4, S5).

The third binary word X is then searched for another pair of consecutive order bits having binary "1" value (Block S6). Those skilled in the art will appreciate that this may be accomplished in a number of ways, for example, by examining the binary word X directly, by examining the first binary word A, which agrees with the binary word X for more significant bits which are unchanged by preceding incrementing operation, and the like. If a another pair of consecutive order bits is found, the first binary word A and the second binary word B are incremented (Blocks S4,S5). When no more consecutive order bits having binary "1" value remain to be found, the operations are completed, leaving first binary word A and second binary word B such that the difference of first binary word A and second binary word B represents the third binary word X (Block S7).

For example, for third binary word X having the binary value "00110011," the first binary word A is initialized to "00110011" and the second binary word B is initialized to "00000000." A first pair of consecutive order bits having binary value "1" are found in third binary word X at the bits corresponding to $2^0$ and $2^1$, so the first binary word A and the second binary word B are incremented by 2, such that the first binary word A is "00110100" and second binary word B is "00000001." A second pair of consecutive order bits having binary "1" are found in the third binary word X at the bits corresponding to $2^4$ and $2^5$, so first binary word A and second binary word B are incremented by $2^4$, so that first binary word A is updated to "01000100" and second binary word B is updated to "00010001."

If the third binary word X represents a negative number, X may be transformed to a positive number by taking a 2's compliment, and then first binary word A and second binary word B may be determined in the manner described above. The negative number may then be determined according to the relationship:

$$-(-X) = -(A - B) \quad (A > 0, B > 0)$$

Table 1 shows first binary word A and second binary word B used to represent third binary word X according to the present inventions, for binary word X corresponding to decimal numbers from 0 to 31 according to the present invention:

TABLE 1

| DECIMAL NUMBERS | X = | A − | B |
| --- | --- | --- | --- |
| 0 | 00000000 = | 00000000 − | 00000000 |
| 1 | 00000001 = | 00000001 − | 00000000 |
| 2 | 00000010 = | 00000010 − | 00000000 |
| 3 | 00000011 = | 00000100 − | 00000001 |
| 4 | 00000100 = | 00000100 − | 00000000 |
| 5 | 00000101 = | 00000101 − | 00000000 |
| 6 | 00000110 = | 00001000 − | 00000010 |
| 7 | 00000111 = | 00001000 − | 00000001 |
| 8 | 00001000 = | 00001000 − | 00000000 |
| 9 | 00001001 = | 00001001 − | 00000000 |
| 10 | 00001010 = | 00001010 − | 00000000 |
| 11 | 00001011 = | 00010000 − | 00000101 |
| 12 | 00001100 = | 00010000 − | 00000100 |
| 13 | 00001101 = | 00010001 − | 00000100 |
| 14 | 00001110 = | 00010000 − | 00000010 |
| 15 | 00001111 = | 00010000 − | 00000001 |
| 16 | 00010000 = | 00010000 − | 00000000 |
| 17 | 00010001 = | 00010001 − | 00000000 |
| 18 | 00010010 = | 00010010 − | 00000000 |
| 19 | 00010011 = | 00010100 − | 00000001 |
| 20 | 00010100 = | 00010100 − | 00000000 |
| 21 | 00010101 = | 00010101 − | 00000000 |
| 22 | 00010110 = | 00100000 − | 00001010 |
| 23 | 00010111 = | 00100000 − | 00001001 |
| 24 | 00011000 = | 00100000 − | 00001000 |
| 25 | 00011001 = | 00100001 − | 00001000 |
| 26 | 00011010 = | 00100010 − | 00001000 |
| 27 | 00011011 = | 00100000 − | 00000101 |
| 28 | 00011100 = | 00100000 − | 00000100 |
| 29 | 00011101 = | 00100001 − | 00000100 |
| 30 | 00011110 = | 00100000 − | 00000010 |
| 31 | 00011111 = | 00100000 − | 00000001 |

As can be seen in Table 1, the present invention can reduce the number of bits having binary "1" value needed to represent the binary word X. Thus, the first and second binary words A and B representing the third binary word X may be used in computing operations in place of the third binary word to reduce processing.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of determining first and second binary words representing a third binary word having a predetermined number of bits, the predetermined number of bits ranging from a least significant bit to a most significant bit, the first and second binary words including a fewer number of bits having a binary 1 value than the third binary word, the method comprising the following steps, performed in a data processing system:

storing a first word the same as the third binary word, in the data processing system;

storing a second word having the predetermined number of zero bits, in the data processing system;

searching for a pair of consecutive order bits having a binary 1 value, in the third binary word, starting at the least significant bit of the third binary word; and incrementing each of the first and second words by 2 raised to a lowest order of the pair of consecutive order bits, for a pair of consecutive order bits having a binary 1 value found in the binary word.

2. A method according to claim 1:

wherein said step of storing a first word comprises the step of storing the first word in a first memory location in the data processing system;

wherein said step of storing a second word comprises the step of storing the second word in a second memory location in the data processing system; and wherein said step of incrementing comprises the steps of:
computing a first sum of the first word stored in the first memory location and 2 raised to the lowest order of the pair of consecutive order bits;
storing the computed sum in the first memory location;
computing a second sum of the second word stored in the second memory location and 2 raised to the lowest order of the pair of consecutive order bits; and
storing the second computed sum in the second memory location.

3. A method according to claim 2 further comprising the step of storing the third word in a third memory location in the data processing system, and wherein said step of searching comprises the step of searching the third word stored in the third memory location.

4. A method according to claim 1, further comprising the step of:

incrementing each of the first and second words by 2 raised to a lowest order of the pair of consecutive order bits, for a second pair of consecutive order bits in the third binary word having binary 1 value.

5. A data processing system for determining first and second binary words representing a third binary word having a predetermined number of bits, the predetermined number of bits ranging from a least significant bit to a most significant bit, the first and second binary words each including a fewer number of bits having a binary 1 value than the third binary word, the data processing system comprising:

first storing means for storing a first binary word having the predetermined number of bits;

second storing means for storing a second binary word having the predetermined number of bits;

means for setting the stored first binary word to the third binary word and for setting the stored second binary word to zero;

means for searching for a pair of consecutive order bits having a binary 1 value in the third binary word, starting at the least significant bit of the third binary word; and means, responsive to said first and second storing means and to said means for searching, for incrementing each of the first and second binary words by 2 raised to a lowest order of the pair of consecutive order bits, for a pair of consecutive order bits having a binary 1 value found in the third binary word.

6. A data processing system according to claim 5, further comprising first, second and third memory locations, and:

wherein said means for storing a first word comprises means for storing the first word in said first memory location;

wherein said means for storing a second word comprises means for storing the second word in said second memory location; and wherein said means for incrementing comprises:
means for computing a first sum of the first word stored in the first memory location and 2 raised to the lowest order of the pair of consecutive order bits;
means for storing the computed sum in said first memory location;
means for computing a second sum of the second word stored in the second memory location and 2 raised to the lowest order of the pair of consecutive order bits; and means for storing the second computed sum in said second memory location.

7. A data processing system according to claim 6 further comprising a third memory location and means for storing the third word in the third memory location, and wherein said means for searching comprises means for searching the third word stored in the third memory location.

8. A computer program product, comprising:
a computer-readable storage medium having computer-readable program code means, embodied in said medium, for determining first and second binary words representing a third binary word having a predetermined number of bits, the predetermined number of bits ranging from a least significant bit to a most significant bit, the first and second binary words including a fewer number of bits having a binary 1 value than the third binary word, said computer-readable program code means comprising:
  first computer-readable program code means for storing a first word the same as the third binary word;
  second computer-readable program code means for storing a second word having the predetermined number of zero bits;
  third computer-readable program code means for searching for a pair of consecutive order bits having a binary 1 value, in the third binary word, starting at the least significant bit of the third binary word; and
  fourth computer-readable program code means, responsive to said first, second and third computer readable program code means, for incrementing each of the first and second words by 2 raised to a lowest order of the pair of consecutive order bits, for a pair of consecutive order bits having a binary 1 value found in the binary word.

9. A computer program product according to claim 8:
wherein said first computer-readable program code means comprises computer-readable program code means for storing the first word in a first memory location in a data processing system;
wherein said second computer-readable program code means comprises computer-readable program code means for storing the second word in a second memory location in the data processing system; and
wherein said fourth third computer-readable program code means comprises:
  fifth computer-readable program code means for computing a first sum of the first word stored in the first memory location and 2 raised to the lowest order of the pair of consecutive order bits;
  sixth computer-readable program code means for storing the computed first sum in the first memory location;
  seventh computer-readable program code means for computing a second sum of the second word stored in the second memory location and 2 raised to the lowest order of the pair of consecutive order bits; and
  eighth computer-readable program code means for storing the second computed sum in the second memory location.

10. A computer program product according to claim 9 further comprising ninth computer-readable program code means for storing the third word in a third memory location, and wherein said third computer-readable program code means comprises tenth computer-readable program code means for searching the third word stored in the third memory location.

* * * * *